United States Patent

Yanagita et al.

[11] Patent Number: 5,856,882
[45] Date of Patent: Jan. 5, 1999

[54] OPTICAL FIBERS AND OPTICAL FIBER AMPLIFIERS

[75] Inventors: Hiroaki Yanagita; Katsuhisa Itoh; Etsuko Hayashi; Hisayoshi Toratani, all of Tokyo, Japan

[73] Assignee: Hoya Corporation, Tokyo, Japan

[21] Appl. No.: 600,501

[22] Filed: Feb. 13, 1996

[30] Foreign Application Priority Data

Feb. 15, 1995 [JP] Japan .................................. 7-026607

[51] Int. Cl.$^6$ .............................. C03C 13/04; H01S 3/06
[52] U.S. Cl. ............................. 359/341; 359/343; 372/6; 385/142; 501/37; 501/40
[58] Field of Search .................... 372/6, 40; 385/142, 385/144; 359/341, 343; 501/37, 40

[56] References Cited

U.S. PATENT DOCUMENTS

| 4,845,057 | 7/1989 | Miura et al. ............................... 501/40 |
| 5,389,584 | 2/1995 | Aitken et al. .............................. 501/40 |
| 5,392,376 | 2/1995 | Aitken ..................................... 385/144 |

FOREIGN PATENT DOCUMENTS

| 0535798 | 4/1993 | European Pat. Off. . |
| 2688778 | 9/1993 | France . |

OTHER PUBLICATIONS

European Search Report by Examiner L. Van Bommel on 30 Jul. 1997 in the Hague.
Derwent Database WPI, AN 85–239497 & JP 60155549, Aug. 15, 1985.
Derwent Database WPI, AN 94–306435 & JP 06232489, Aug. 19, 1994.
Patent Abstracts of Japan, vol. 95, No. 008, Sep. 29, 1995 & JP 07 138042 (Hoya Corp), May 30, 1995.
Balda et al, J. Non–Cyst. Solids (Netherlands, vol. 161, pp. 133–136, 1993 (abstract only herewith).
Macfarlane D.R.; Journal of Non–Cyst. Solids, vol. 140, pp. 1–3, Jan. 2, 1992; abst only herewith.
Yavagta et al, Conf. Opt. Fiber Commun., vol. 81 1955, Feb. 3, 1995, abst. only herewith.

*Primary Examiner*—Nelson Moskowitz
*Attorney, Agent, or Firm*—Burns, Doane, Swecker & Mathis, L.L.P.

[57] ABSTRACT

Disclosed are an optical fiber comprising a core and a cladding wherein the core is composed of a In-Ga-Cd-Pb halide glass and the clad composed of a halide glass possesses a refractive index of 1.515 or less, which has a large specific refractive index difference (Δn) and a large numerical aperture, and such an optical fiber as mentioned above wherein the core contains one or more activating ions as well as an optical fiber amplifier comprising a pumping source, a laser glass fiber and a means for introducing pumping light and signal light into the above laser glass fiber, wherein the laser glass fiber is the optical fiber of the present invention mentioned above.

23 Claims, 3 Drawing Sheets

OPTICAL FIBERS AND OPTICAL FIBER AMPLIFIERS

BACKGROUND OF THE INVENTION

1. Field of the Invention

The present invention relates to optical fibers made from halide glasses which are transparent in the visible to infrared region and applicable to optical communication, optical measurement and laser light transmission.

The present invention also relates to optical fibers having a core glass doped with rare earth ions as activating species and applicable to optical media for amplifying the light in the visible to infrared region, optical materials for constituting a laser unit and the like.

The present invention further relates to optical fibers for the light amplification which are applicable to optical communication systems and optical amplifiers incorporating such optical fibers. According to the present invention, optical fibers for the light amplification and optical amplifiers incorporating such optical fibers advantageously exhibit an elevated gain coefficient.

2. Related Art

Transparency limit of glasses in long wavelength region is decided according to phonon energy of the glasses. That is, a glass with a smaller phonon energy have a transparency limit at a longer wavelength. Fluoride glasses based on zirconium fluoride ($ZrF_4$) are known as glass materials having good transparency properties in the visible to infrared region. These fluoride glasses exhibit an excellent devitrification resistance. However, Zr ions strongly attract anionic ions due to their relatively small atomic weight and high valence (tetravalent). As a result, these zirconium fluoride glasses have about 550 cm$^{-1}$ of phonon energy ($h\omega/2\pi$) and absorb the light of about 4–5 $\mu$m or longer. Thus use of these glasses is restricted in the longer wavelength region.

It has been known that, when crystals or glasses doped with rare earth ions are used as laser materials, non-radiative relaxation rate (Wnr) due to the multiphonon relaxation is generally represented by the following equation:

$$Wnr=Wnr(0)\cdot\exp[-\alpha\cdot\Delta E/(h\omega/2\pi)]$$

In the above equation, Wnr(0) and $\alpha$ are constants inherent in materials, $\Delta E$ is an energy gap between the emission level (excitation level) and an another level immediately below the emission level and $h\omega/2\pi$ is an maximum phonon energy of glasses. Among these factors, it is $h\omega/2\pi$ that predominantly influences on the Wnr of glasses. In other words, it can be said that, in glasses having a larger $h\omega/2\pi$, non-radiative relaxation rate becomes larger and radiative quantum efficiency is lowered.

The above-mentioned zirconium fluoride glasses based on $ZrF_4$ have the drawback that, since they have the value of $h\omega/2\pi$ as high as about 550 cm$^{-1}$, the rare earth ions doped therein have a lower radiative quantum efficiency as calculated by the above equation (see R. S. Doel et al., Journal of Non-Crystalline Solids, 161, 1993, p.257).

An optical fiber is generally composed of a core and a cladding, the latter having a lower refractive index. When the refractive index of core is designated as $n_1$, and that of cladding is designated as $n_2$, $\Delta n$ in the following equation is called the specific refractive index difference:

$$\Delta n=[(n_1-n_2)/n_1]\times 100(\%)$$

The numerical aperture (N.A.) is defined as follows:

$$N.A.=[(n_1)^2-(n_2)^2]^{1/2}$$

From the relations set forth above, it might be said that a fiber having a larger specific refractive index difference has also a larger numerical aperture.

The numerical aperture is the measure of the angle within which incident light can be caught by the fiber. In other words, it is the measure of the maximum incident angle of light which can propagate within the fiber. A fiber having a larger numerical aperture may permit much light to be entered into the fiber. Thus, the fibers with an elevated numerical aperture and an increased specific refractive index difference are preferred when applied in optical measurement, laser light transmission and the like, Fibers having a core doped with rare earth ions are expected to be a promising material for fabricating fiber lasers or fiber amplifiers. That is to say, by imparting to such fibers an increased numerical aperture and an increased specific refractive index difference, it will become possible to confine the propagated light energy to the smaller core. Accordingly, an increased numerical aperture and an increased specific refractive index difference will be preferred for obtaining an improved efficiency of lasing and amplification.

As known methods for increasing the specific refractive index difference and the numerical aperture of a fiber made from halide glass, fluoride glass and the like, there are (1) a method for decreasing the refractive index by adding Hf to a cladding, and, (2) a method for increasing the refractive index by adding heavy metals such as Pb ions to a core (Japanese Patent Laid Open (JP-A-) Nos. 6-24791 and 6-69584).

The fiber disclosed in the above 6-24791 has a specific refractive index difference ($\Delta n$) of 3.5% at maximum.

The 6-69584 reference discloses the fiber which may have theoretically the maximum value of 5.4% as the specific refractive index difference ($\Delta n$). However, this value was obtained by preparing a core glass and a cladding glass separately and calculating the specific refractive index difference ($\Delta n$) of the fiber from the respective refractive indices of these glasses. In fact, the maximum value of the specific refractive index difference ($\Delta n$) which was measured practically on the obtained fiber was only 3.7%.

The fibers described in the above documents contain a core made from glass based on zirconium fluoride. The optical fiber amplifiers operating at 1.3 $\mu$m range generally require the optical fibers doped with Pr ions as activating species. The problem is that the radiative quantum efficiency at 1.3 $\mu$m range obtained by the fluoride glass based on zirconium fluoride doped with Pr ions is lower than that obtained by other fluoride glasses based on indium fluoride optionally with gallium fluoride and doped with Pr ions (see S. Doel, ibid.).

By increasing the specific refractive index difference ($\Delta n$) by 1%, for example by increasing from 3% to 4%, one could expect an increase of about 20% to 30% in efficiency (Japanese Patent Laid Open No.6-69584). A core-forming glass having a high refractive index and a clad-forming glass having a low refractive index could be fabricated independently. However, fiber formation from these glasses was not always easy due to the differences of characteristics between these glasses, such as glass transition temperatures, crystallization temperatures and so on.

Therefore, an object of the present invention is to provide an optical fiber having a large numerical aperture and a specific refractive index difference ($\Delta n$) of at least 4%, preferably at least 5.5%, which comprises a core and a cladding, both being constituted by fiber-formable glasses, and the core being composed of a glass having a high quantum efficiency of activating ions such as $Pr^{3+}$.

Another object of the present invention is to provide an optical fiber described above wherein the core contains an activating species, and is applicable to fiber lasers, optical amplifiers and others.

Further object of the present invention is to provide an optical amplifier made from an optical fiber with a core containing an activating species.

SUMMARY OF THE INVENTION

The present invention provides an optical fiber comprising a core and a cladding wherein the core is composed of a In-Ga-Cd-Pb halide glass and the cladding composed of a halide glass possesses a refractive index of 1.515 or less.

According to a preferred embodiment of the present invention, the optical fiber comprises a core and a cladding wherein the core is composed of a In-Ga-Cd-Pb halide glass and the cladding composed of a halide glass possesses a refractive index of 1.500 or less.

According to another embodiment of the present invention, the optical fiber is characterized in that the In-Ga-Cd-Pb halide glass contains activating ions optionally with sensitizing ions for sensitizing said activating ions.

The present invention further provides an optical fiber amplifier comprising a pumping source, an optical fiber and a means for introducing pumping light and signal light into said optical fiber, wherein said optical fiber comprising a core which contains activating ions is constituted by an optical fiber of the present invention.

The present invention will now be described in more detail in the following.

DETAILED DESCRIPTION OF PREFERRED EMBODIMENTS

Figure 1:
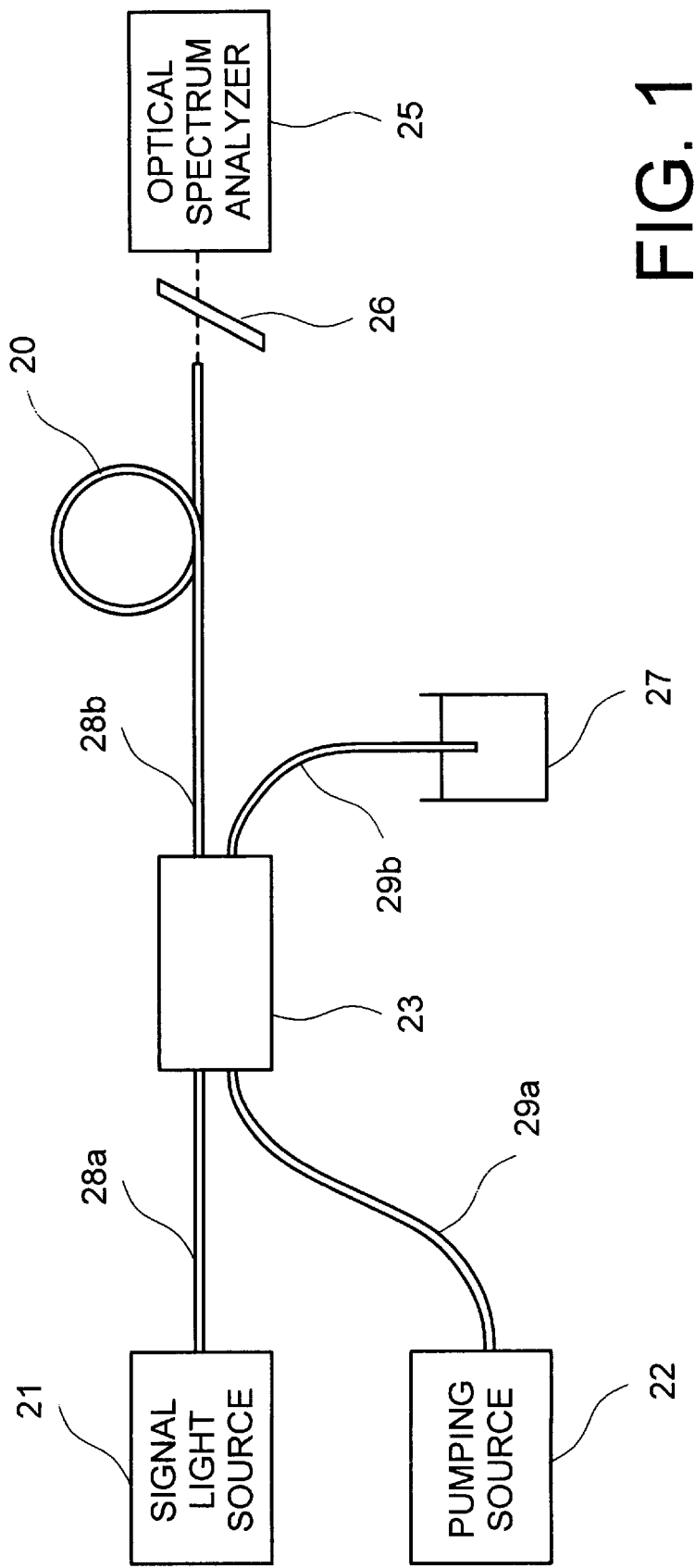
FIG. 1 illustrates an optical fiber amplifier of the present invention.

The In-Ga-Cd-Pb halide glasses which may be mentioned are those which contain, expressed in terms of mol %, In: 15–40%,
Ga: 15–40%,
 wherein In+Ga=35–65%,
Cd: 5–40%,
Pb: 10–30%, as cations constituting a glass, and F or F and Cl as anions wherein the Cl content is 10% or less.

In the above In-Ga-Cd-Pb halide glasses, In and Ga ions are essential components for forming the glass network. The In ion content ranges 15–40% (constituents are hereinafter expressed in mol %) and the Ga ion content ranges 15–40% with the sum of both (In+Ga) being 35–65%. If the In ion content exceeds 40%, the resulting glass will easily crystallize and it will be difficult to obtain a stable glass. Where the In ion content is below 15% a glass melt becomes turbid and yellow brown color, and it is difficult to obtain a transparent glass. When the Ga ion content exceeds 40%, a glass melt is likely to become turbid and yellow brown color, and it is difficult to obtain a transparent glass. If the Ga ion content is less than 15% the resulting glass will easily crystallize and a stable glass is not obtainable.

When the total content of In and Ga ions (In+Ga) exceeds 65%, it becomes difficult to obtain a homogeneous glass melt and a homogeneous glass. On the other hand, when it is less than 35%, the resulting glass becomes likely to crystallize.

In the In-Ga-Cd-Pb halide glasses, Cd and Pb ions are essential components for modifying the glass network. Due to the coexistence of these ions, the melting temperature is lowered, hence a homogeneous glass melt can be obtained at lower temperatures, thus devitrification resistance of a glass can be improved. The contents of Cd and Pb ranges from 5 to 40% and from 10 to 30%, respectively. When the Cd ion content exceeds 40%, the resulting glass easily crystallizes and it is difficult to obtain a stable glass. Moreover, chemical durability of the glass is likely to degrade and it is hard to use in practice. On the contrary, where the Cd ion content is below 5%, the resulting glass is easily crystallize and a stable glass cannot be obtained. If the Pb ion level exceeds 30%, the resulting glass easily crystallize and obtaining a stable glass is difficult. When the Pb ion content is less than 10%, the raw material is likely to vaporize vigorously, hence the resulting glass is likely to crystallize and it is difficult to obtain a stable glass.

The In-Ga-Cd-Pb halide glasses contain F optionally with Cl as anions. If the glasses contain Cl ions, the content thereof is suitably 10 mol % or less. When the content exceeds this level, the resulting glass is likely to crystallize and it is difficult to obtain a stable glass. In addition, chemical durability of the glass is also lowered and thus it is hard to use in practice.

Although essential components and the quantitative ranges thereof have been described above, preferable cation contents may be, expressed in terms of mol %:

In: 17–35%,
Ga: 17–35%,
 wherein In+Ga=40–65%,
Cd: 7.5–30%,
Pb: 12–30%.

When Cl ions are contained as anions, the content thereof may be preferably 5% or less.

Further, into the above In-Ga-Cd-Pb halide glasses, additive ions may be introduced for the purpose of improving the devitrification resistance of a glass, or, for the purpose of controlling various glass properties such as refractive index, glass transition temperature and the like. These additive ions and the amounts thereof may be, expressed in terms of mol %:

Li: 0–12%, Na: 0–12%, K: 0–12%,
Cs: 0–12%, Tl: 0–12%,
Mg: 0–8%, Ca: 0–23%, Sr: 0–23%,
Ba: 0–34%, Zn: 0–28%, Sn: 0–34%,
Y: 0–12%, La: 0–12%, Gd: 0–12%,
Lu: 0–12%,
Pr: 0–12%, Nd: 0–12%, Sm: 0–12%,
Eu: 0–12%, Tb: 0–12%, Dy: 0–12%,
Ho: 0–12%, Er: 0–12%, Tm: 0–12%,
Yb: 0–12%,

Bi: 0–9%, Zr: 0–15% Hf: 0–15%

Among these additive ions, those which are effective for improving the devitrification resistance of a glass are Na, K, Ca, Sr, Ba, Zn, Sn, Y, La, Gd, Lu, Pr, Nd, Sm, Eu, Tb, Dy, Ho, Er, Tm, Yb, Zr, Hf and others.

The refractive index of a glass will also be modified by the introduction of the elements (ions) set forth above. For instance, when the glass is required to have an elevated refractive index, it may be effective to replace a part of Cd with Bi or to replace a part of Ga with Cs, Tl or the like. On the contrary, when the glass is required to have a lowered refractive index, it may be effective to replace a part of Pb with Li, Na, K, Cs, Mg, Ca, Sr, Ba, Zn, Sn, Y, La, Gd or Lu.

The total content of these additive ions are preferably in the range of 0.01 to 35%. When this total content is less than 0.01%, improvements of the devitrification resistance and the property control are not sufficiently effective, whereas at the total content exceeding 35%, the glass becomes likely to crystallize.

When the above In-Ga-Cd-Pb halide glasses are doped with additive ions consisting of rare earth ions which are activating species, the resulting glasses can be applicable to laser materials by utilizing the luminescence thereof. Examples of these activating rare earth ions include Pr, Nd, Sm, Eu, Tb, Dy, Ho, Er, Tm and Yb.

The content of activating ions (the total content when 2 or more species are doped) is suitably in the range of 0.01 to 12%. If such activating ions exist at the content of less than 0.01%, the ionic density thereof would be so small that the resulting glass could not exhibit an excitation efficiency enough for laser oscillation or light amplification, resulting in the demand of higher excitation energy. On the contrary, if such activating ions exist at the content exceeding 12%, the glass becomes likely to crystallize.

The In-Ga-Cd-Pb halide glasses which constitute a core glass of the present invention may contain one or more kinds of activating ions. The activating ions are mainly selected from rare earth ions. Their examples are $Pr^{3+}$ (0.6, 1.0, 1.3 $\mu$m), $Nd^{3+}$ (0.9, 1.06, 1.3 $\mu$m), $Sm^{3+}$ (0.6, 1.3 $\mu$m), $Eu^{3+}$ (0.6 $\mu$m), $Tb^{3+}$ (0.5 $\mu$m), $Dy^{3+}$ (1.3, 3.0 $\mu$m), $Ho^{3+}$ (0.7, 1.0, 1.2, 1.3, 1.4, 1.5, 1.7, 2.1, 2.4, 2.9 $\mu$m), $Er^{3+}$ (0.7, 0.9, 1.3, 1.6, 1.7, 2.8 $\mu$m), $Tm^{3+}$ (2.0, 2.4 $\mu$m), $Yb^{3+}$ (1.0 $\mu$m) and the like. The parenthesized numbers indicate their major light emitting wavelengths. In addition to the rare earth ions, the activating ions may be selected from transition metal ions.

The optical fibers of the present invention are those which are composed of a core and a cladding. Activating ions to be contained in the core halide glass could be selected as appropriate depending on the end use of an optical fiber. For example, as a core glass of an optical fiber applicable to the 1.3 $\mu$m amplification, glasses containing one or more activating ions selected from the group consisting of Pr, Nd, Sm, Dy, Ho and Er which produce light emission at 1.3 $\mu$m region may be suitably used.

The laser glasses of the present invention may contain sensitizing ions for sensitizing the activating ions described above. The sensitizing ions may be suitably selected depending on the activating ions. Combinations of the activating ions and the sensitizing ions are exemplified below. Parenthesized ions are the sensitizing ions and the ions before the parentheses are the activating ions.

$Pr^{3+}$ ($Yb^{3+}$)
$Nd^{3+}$ ($Ce^{3+}$, $Cr^{3+}$)
$Sm^{3+}$ ($Tb^{3+}$),
$Tb^{3+}$ ($Gd^{3+}$)
$Dy^{3+}$ ($Er^{3+}$),
$Ho^{3+}$ ($Cr^{3+}$, $Yb^{3+}$, $Er^{3+}$, $Tm^{3+}$),
$Er^{3+}$ ($Yb^{3+}$, $Cr^{3+}$,
$Tm^{3+}$ ($Cr^{3+}$, $Er^{3+}$, $Yb^{3+}$)
$Yb^{3+}$ ($Nd^{3+}$, $Cr^{3+}$)

Amount of the sensitizing ions to be added may suitably be decided considering kinds of the activating ions and amounts thereof, pumping efficiency and the like.

On the other hand, the cladding of the optical fiber of the present invention is composed of halide glasses having a refractive index of 1.515 or less, preferably of 1.500 or less.

Halide glasses suitable for a cladding having a refractive index of 1.515 or less are those which contain, expressed in terms of mol %, In: 28–40%,
Zn: 20–30%,
Ba: 15–25%,
Sr: 8–20%, as cations and F as anions.

Each of In, Zn, Ba and Sr ions is an essential component for forming the glass network.

When the contents of these ions are outside the ranges above, the resulting glass is likely to crystallize and it is difficult to obtain a homogeneous glass, and it is hard to use in practice. Moreover, additional ions may be added to the glass for the formation of cladding for the purpose of improving the devitrification resistance and the control properties of glass such as refractive index, glass transition temperature and the like.

The halide glass having a refractive index of 1.515 or less further contains, expressed in terms of mol %, Pb: 0–10%, Ga: 0–6%, Al: 0–4%,
Ca: 0–6%, Cd: 0–5%, Y: 0–4%,
La: 0–2%, Na: 0–5%, Li: 0–4%, as additional cations constituting the glass and the total content of the above cations may be 2–25%.

When the contents of these ions are outside the ranges above, the resulting glass will easily crystallize and it will be difficult to obtain a homogeneous glass and it is hard to use in practice.

The halide glass for a cladding having a refractive index of 1.500 or less contains, expressed in terms of mol %, In: 30–40%,
Zn: 20–30%,
Ba: 15–25%,
Sr: 10–20%, as cations constituting the glass and F as anions constituting the glass.

Each of In, Zn, Ba and Sr ions is an essential component for forming the glass network.

When the contents of these ions are outside the above ranges, the resulting glass is likely to crystallize, and it is difficult to obtain a homogeneous glass and is hard to use in practice. Moreover, additional ions may be added to the glass for the formation of cladding for the purpose of improving the devitrification resistance and the control properties of glass such as refractive index, glass transition temperature and the like.

The halide glass having a refractive index of 1.500 or less further contains, expressed in terms of mol %, Ga: 0–6%, Ca: 0–6%, Cd: 0–5%,
Y: 0–2%, La: 0–2%, Na: 0–5%,
Li: 0–2%, as additional cations constituting the glass and the total content of the above cations may be 2–15%.

When the contents of these ions are outside the above ranges, the resulting glass is likely to crystallize and it is difficult to obtain a homogeneous glass and is hard to use in practice.

Another embodiment of the glass for the formation of cladding composed of a halide glass having a refractive index of 1.515 or less includes the halide glass which contains, expressed in terms of mol %, at least one of Zr and Hf: 45–55%,
Ba: 17–25%,
Pb: 0–7%,
La: 0–5%,
Y: 0–4%,
Gd: 0–4%,
   wherein La+Y+Gd=3.5–6%,
Al: 2.5–5%,
Na: 5–23%,
Li: 0–18%,
Cs: 0–8%,
   wherein Na+Li+Cs=17–23%,
In: 0–2%, as cations constituting the glass and F as anions constituting the glass.

Zr and/or Hf and Ba ions each is an essential component for forming the glass network.

La, Y, Gd, Al and Na are the components for improving the devitrification resistance of a glass.

When the contents of these ions are outside the above ranges, the resulting glass is somewhat likely to crystallize and a homogeneous glass cannot be easily obtainable and thus becoming poorer in practicability.

Moreover, additional ions such as Pb, Li, Cs and In etc. may be added to the glass for the formation of cladding for the purpose of improving the devitrification resistance and the control properties of a glass such as refractive index, glass transition temperature and the like.

When the contents of these additional ions are outside the above ranges, the resulting glass is likely to crystallize and it becomes difficult to obtain a homogeneous glass, thus becoming poorer in practicability.

Another embodiment of the glass for the formation of cladding having a refractive index of 1.500 or less is the halide glass which contains, expressed in terms of mol %, at least one of Zr and Hf: 45–55%,
Ba: 17–25%,
Pb: 0–2%,
La: 0–5%,
Y: 0–4%,
Gd: 0–4%,
   wherein La+Y+Gd=3.5–6%,
Al: 2.5–5%,
Na: 5–23%,
Li: 0–18%,
Cs: 0–4%,
   wherein Na+Li+Cs=17–23%,
In: 0–2%, as cations constituting the glass and F as anions constituting the glass.

Zr and/or Hf and Ba ions each is an essential component for forming the glass network.

La, Y, Gd, Al and Na are the components for improving the devitrification resistance of a glass.

When the contents of these ions are outside the above ranges, the resulting glass is somewhat likely to crystallize and a homogeneous glass cannot be obtainable, thus becoming poorer in practicability.

Moreover, additional ions such as Pb, Li, Cs and In etc. may be added to the glass for the formation of cladding for the purpose of improving the devitrification resistance and the control properties thereof such as refractive index, glass transition temperature and the like.

When the contents of these additional ions are outside the above ranges, the resulting glass is likely to crystallize and it is difficult to obtain a homogeneous glass, thus becoming poorer in practicability.

The optical fibers of the present invention can be fabricated by conventional methods from the core- and clad-forming glasses as described above. For example, rod-like preforms having a two-layer structure of core glass and cladding glass are formed and then the rod-like preforms are subjected to be drawn into fibers. Shape and size of the fibers are not particularly limited. In general, they preferably have an outer diameter of 100 to 500 $\mu$m, a core diameter of 1 to 15 $\mu$m. However, they are not limited to the above-specified ranges and they may be suitably selected in view of the intended uses of the fibers and the like.

The specific refractive index difference ($\Delta$n) between the core glass and the cladding glass may be at least 4.0% when the cladding glass is constituted by a glass having a refractive index of 1.515 or less, and may be at least 5.5% when the cladding glass is constituted by a glass having a refractive index of 1.500 or less.

The optical amplifiers of the present invention will now be explained hereinafter.

The optical amplifiers of the present invention can be used to amplify signal transmitted through a fiber. In optical fiber amplifiers, because signal light and pumping light are confined in a small core in the longitudinal direction, large amplification gain can be obtained even with a small gain coefficient by using long fibers.

The optical fiber amplifiers of the present invention comprise a pumping source, an optical fiber and a means for introducing pumping light and signal light into the optical fiber, wherein the optical fiber of the present invention is applied. Optical fiber amplifiers are explained in detail in, for example, Japanese Patent Laid Open (JP-A-) Nos. 5-63285 and 5-136516. The optical amplifiers of the present invention correspond to those conventional optical fiber amplifiers in which the optical fibers of the present invention is applied.

In particular, optical amplifiers comprising an optical fiber having a core composed of a glass doped with activating ion such as Pr or Dy ion are expected to be practically used as optical fiber amplifiers at 1.3 $\mu$m region.

FIG. 1 is a schematic view of an optical fiber amplifier comprising an optical fiber of the present invention. As shown in this figure, the optical fiber amplifier comprises optical fiber 20 for amplifying signal light, pumping source 22, and optical fiber coupler 23, which is a means for introducing the pumping light and the signal light into optical fiber 20.

The signal light from signal light source 21 is connected to one input port 28a of coupler 23. Pumping source 22 is connected to another input port 29a. Output port 29b of optical coupler 23 may be immersed in matching oil 27 to prevent light from coming back. Another output port 28b of optical coupler 23 is connected to optical fiber 20 through an optical connector or the like and introduces the signal light and the pumping light into fiber 20.

Output light from optical fiber 20 is guided to optical spectrum analyzer 25 in order to monitor intensity, wavelength and the like of the amplified signal light. Alternatively, the output light may be guided to light spectrum analyzer 25 after having filtered the pumping light through band-pass filter 26.

Operation of the optical fiber amplifier of FIG. 1 will be briefly explained about the case where it amplifies the signal light of 1.3 μm region. Signal light of 1.3 μm region supplied from input port 28a is introduced into optical fiber 20 through optical coupler 23. Simultaneously, pumping light supplied from pumping source 22 is also introduced into optical fiber 20 through input port 29a and coupler 23. This pumping light excites the activating ions contained in optical fiber 20. When the activating ions are $Pr^{3+}$, they are excited to the level $^1G_4$ by pumping light of 1.02 μm in wavelength. These $Pr^{3+}$ ions, when being stimulated by the signal light, emit the light of the 1.3 μm region which corresponds to the transition of $^1G_4$ to $^3H_5$ which had been induced by the signal light. When the intensity of the pumping light exceeds a certain level, the signal light could be amplified.

Though the operation of the optical fiber amplifier was explained by referring to an example utilizing signal light of the 1.3 μm region, optical fiber amplifiers applicable to the wavelength of other regions may be constructed by using optical fibers comprising a core glass which contains activating ions having an emission spectra matched with a wavelength of signal light.

Wavelength of the pumping light can be suitably decided depending on kinds of the activating ions or the sensitizing ions.

Further, instead of optical coupler 23 described above, a half mirror or the like may be used as a means for introducing the pumping light and the signal light into optical fiber 20.

EXAMPLES

The present invention will be further explained hereinafter by referring to the following examples.

Example 1

(1) Preparation of a core glass

Starting materials of $InF_3$, $GaF_3$, $CdF_2$, $PbF_2$, $ZnF_2$ and $LaF_3$, each of them being an anhydride, were weighed and mixed so as to obtain a batch of 23.5 $InF_3$-23.5 $GaF_3$-15 $CdF_2$-20 $PbF_2$-13 $ZnF_2$-5 $LaF_3$, expressed in terms of mol %. 2 g of $NH_4HF_2$ was added to 30 g of the batch and mixed, and then melted in a carbon crucible by heating at about 900° C. for 1 hour under an argon atmosphere. The crucible was taken out from a furnace and the obtained melt in the crucible was poured into a brass mold followed by quenching to about 250° C. and slowly cooling to room temperature to obtain a glass disk having a diameter of about 35 mm and a thickness of about 5 mm.

(2) Preparation of cladding glass

Starting materials of $InF_3$, $ZnF_2$, $BaF_2$, $SrF_2$, $PbF_2$, $AlF_3$ and $LaF_3$, each of them being an anhydride, were weighed and mixed so as to obtain a batch of 35 $InF_3$-25 $ZnF_2$-20 $BaF_2$-10 $SrF_2$-5 $PbF_2$-4 $AlF_3$-1 $LaF_3$, expressed in terms of mol %. 2 g of $NH_4HF_2$ was added to 35 g of the batch and mixed, and then melted in a carbon crucible by heating at about 900° C. for 1 hour under an argon atmosphere. The crucible was taken out from a furnace and the obtained melt in the crucible was poured into a brass mold followed by quenching to about 250° C. and slowly cooling to room temperature to obtain a glass disk having a diameter of about 35 mm and a thickness of about 7 mm.

(3) Preparation of a preform and a fiber

Figure 2:
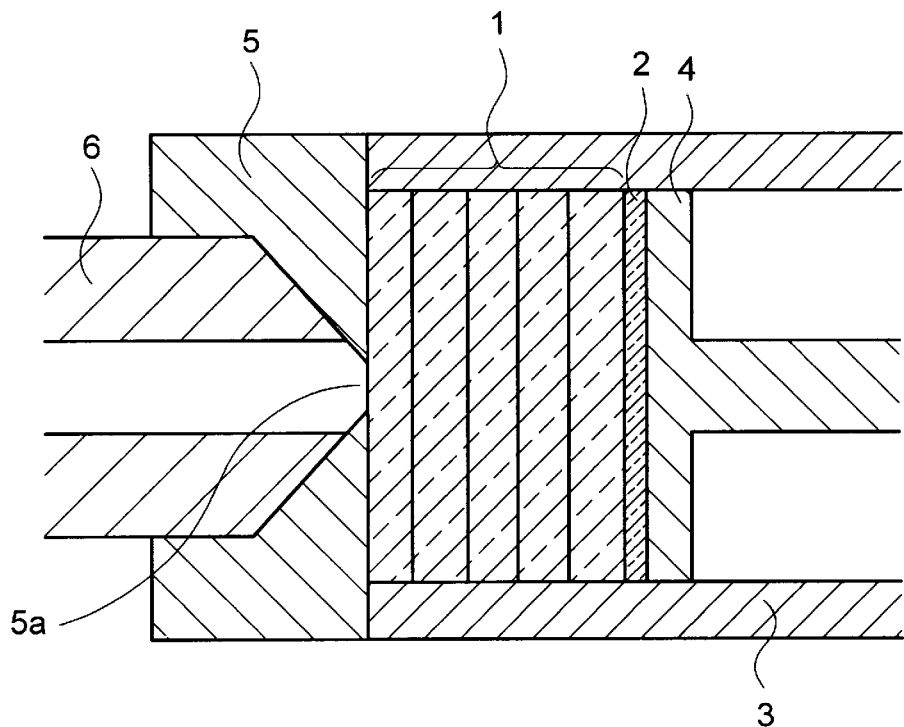
FIG. 2 illustrates an extrusion molding machine used for molding glass preforms wherein glass for core and glass for cladding are mounted.
Figure 3:
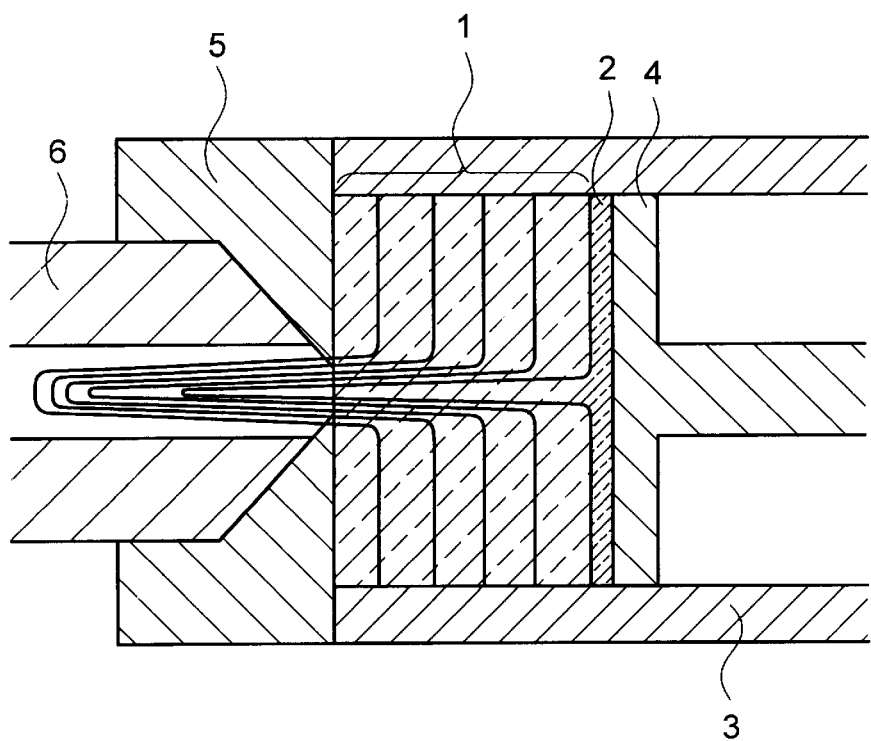
FIG. 3 illustrates an extrusion molding machine used for molding glass preforms wherein glasses are being extruded.

A preform was prepared in an extrusion molding machine shown in FIGS. 2 and 3. Both surface of five pieces of cladding glass disk 1 and a surface (one side only) of core glass disk 2 were polished to a surface precision of more than λ/2. The polished surfaces of the glasses were optically contacted in a clean booth. Then, glasses 1 and 2 were introduced into a cylinder 3 having an inner diameter of about 35 mm so that core glass 2 was positioned on the side of punch 4 and heated to about 300° C. As shown in FIG. 3, a glass rod with two-layer structure was extruded from molding hole 5a (a diameter of 5 mm) on molding section 5, along liner section 6 by applying pressure of 50 bar to punch 4 to produce a preform.

The resulting preform has a cladding diameter of 5.0 mm, a core diameter of 4.6 mm and a length of 120 mm.

In this example, the preform was prepared by an extrusion molding method. However, other known methods for the preparation of fiber preform of fluorides are also applicable: build-in casting ("Fluoride Glasses" ed. A. E. Comyns (John Willy & Sons, America), p187), rotational casting and suction casting (T. Kanamori, Materials Science Forum, Vol. 19–20, pp363–374). Of course, it is possible to use these methods in combination and a suitable method can be selected.

The obtained preform was subjected to be drawn into a fiber having an outer diameter of 200 μm and a core diameter of 185 μm. The fiber exhibited a transmission loss of 0.05 dB/ml at 3.5 μm and had an excellent transparent property.

The glasses were prepared separately by the same procedures as those of the preparations of core and cladding glasses mentioned above and refractive indices (nD) at 589.291 nm of the obtained glasses were measured. The refractive index of the core glass was 1.602 and that of cladding glass was 1.512. The specific refractive index difference of the above fiber was 5.6% (numerical aperture: 0.53).

Examples 2 to 10

In each of these examples, a cladding glass having a composition shown in Table 1 was produced in the same manner as in Example 1. By using the obtained cladding glass (having a refractive index of at most 1.515) together with a core glass as described in Example 1, a fiber similar to that of Example 1 was produced. The specific refractive index difference between the core and the cladding is shown in the lowermost row in Table 2. The differences had a value in the range of 5.4% to 5.7%. The fibers which were obtained in these examples showed a transmission loss in the range of 0.05 to 0.2 dB/m at the wavelength of 3.5 μm, which confirmed an excellent transparent property.

TABLE 1

| Example | 2 | 3 | 4 | 5 | 6 | 7 | 8 | 9 | 10 |
|---|---|---|---|---|---|---|---|---|---|
| Starting Materials | | | | | | | | | |
| $InF_3$ [mol %] | 30 | 30 | 30 | 37 | 32 | 28 | 34 | 35 | 30 |
| $ZnF_2$ | 25 | 25 | 25 | 23 | 28 | 27 | 24 | 25 | 25 |
| $BaF_2$ | 20 | 15 | 15 | 20 | 20 | 20 | 24 | 18 | 18 |

5,856,882

TABLE 1-continued

| Example | 2 | 3 | 4 | 5 | 6 | 7 | 8 | 9 | 10 |
|---|---|---|---|---|---|---|---|---|---|
| $SrF_2$ | 9 | 9 | 9 | 10 | 10 | 9 | 8 | 12 | 11 |
| $PbF_2$ | 5 | 9 | 9 | 5 | 5 | 5 | 5 | 5 | 5 |
| $GaF_3$ | 4 | 3.5 | 3.5 | | | 4 | | | 4 |
| $AlF_3$ | | 1.5 | 1.5 | 4 | 4 | | 4 | 4 | |
| $YF_3$ | 4 | 4 | 4 | | | 4 | | | 2 |
| $LaF_3$ | | | | 1 | 1 | | 1 | 1 | 2 |
| LiF | | | | 3 | | | | | |
| NaF | 3 | 3 | | | | 3 | | | 3 |
| Cations Total (mol %) | 100 | 100 | 100 | 100 | 100 | 100 | 100 | 100 | 100 |
| Cladding Refractive Index ($n_D$) | 1.515 | 1.514 | 1.512 | 1.514 | 1.511 | 1.513 | 1.514 | 1.511 | 1.515 |
| Core Refractive Index ($n_D$) | 1.602 | 1.602 | 1.602 | 1.602 | 1.602 | 1.602 | 1.602 | 1.602 | 1.602 |
| Specific Refractive Index Difference (Δ [n%]) | 5.4 | 5.5 | 5.6 | 5.5 | 5.7 | 5.6 | 5.5 | 5.7 | 5.4 |

Examples 11 to 20

In each of these examples, a cladding glass having a composition shown in Table 2 was produced in the same manner as in Example 1. By using the obtained cladding glass (having a refractive index of at most 1.500) together with a core glass as described in Example 1, a fiber similar to that of Example 1 was produced. The specific refractive index difference between the core and the cladding is shown in the lowermost row in Table 2. The differences had a value in the range of 6.5% to 7.1%. The fibers which were obtained in these examples showed a transmission loss in the range of 0.05 to 0.2 dB/m at the wavelength of 3.5 μm, which confirmed an excellent transparent property.

(2) Preparation of cladding glass

Starting materials of $ZrF_2$, $BaF_2$, $LaF_3$, $AlF_3$ and NaF, each of them being an anhydride, were weighed and mixed so as to obtain a batch of 53 $ZrF_2$-20 $BaF_2$-4 $LaF_3$-3 $AlF_3$-20 NaF, expressed in terms of mol %. 3.5 g of $NH_4HF_2$ was added to 60 g of the batch and mixed, and then melted in a carbon crucible by heating at about 850° C. for 1 hour under an argon atmosphere. The crucible was taken out from a furnace and the obtained melt in the crucible was poured into a brass mold followed by quenching to about 250° C. and slowly cooling to room temperature to obtain a glass disk having a diameter of about 35 mm and a thickness of about 15 mm.

(3) Preparation of a preform and a fiber

TABLE 2

| Example | 11 | 12 | 13 | 14 | 15 | 16 | 17 | 18 | 19 | 20 |
|---|---|---|---|---|---|---|---|---|---|---|
| Starting Materials | | | | | | | | | | |
| $InF_3$ [mol %] | 40 | 40 | 40 | 34 | 40 | 40 | 40 | 30 | 40 | 40 |
| $ZnF_2$ | 20 | 20 | 20 | 20 | 20 | 20 | 20 | 30 | 20 | 20 |
| $BaF_2$ | 15 | 16 | 16 | 16 | 20 | 15 | 15 | 15 | 16 | 16 |
| $SrF_2$ | 20 | 20 | 20 | 20 | 10 | 20 | 20 | 20 | 20 | 20 |
| $GaF_3$ | | | | 6 | | | | | | |
| $AlF_3$ | | | | | | | | | | |
| $CaF_2$ | 5 | | | | 6 | | 5 | | | |
| $YF_3$ | | | 2 | 2 | | | | | 2 | |
| $LaF_3$ | | 2 | 2 | | 2 | | | | | 2 |
| LiF | | | | | | | | | | 2 |
| NaF | | 2 | | 2 | 2 | | | 5 | 2 | |
| $CdF_2$ | | | | | | 5 | | | | |
| Cations Total (mol %) | 100 | 100 | 100 | 100 | 100 | 100 | 100 | 100 | 100 | 100 |
| Cladding Refractive Index ($n_D$) | 1.495 | 1.493 | 1.495 | 1.489 | 1.493 | 1.498 | 1.495 | 1.493 | 1.493 | 1.492 |
| Core Refractive Index ($n_D$) | 1.602 | 1.602 | 1.602 | 1.602 | 1.602 | 1.602 | 1.602 | 1.602 | 1.602 | 1.602 |
| Specific Refractive Index Difference (Δ [n%]) | 6.7 | 6.8 | 6.7 | 7.1 | 6.8 | 6.5 | 6.7 | 6.8 | 6.8 | 6.9 |

Example 21

(1) Preparation of a core glass

Starting materials of $InF_3$, $GaF_3$, $CdF_2$, $PbF_2$, $ZnF_2$ and $LaF_3$, each of them being an anhydride, were weighed and mixed so as to obtain a batch of 20 $InF_3$-20 $GaF_3$-5 $CdF_2$-30 $PbF_2$-21 $ZnF_2$-4 $LaF_3$, expressed in terms of mol %. 2 g of $NH_4HF_2$ was added to 30 g of the batch and mixed, and then melted in a carbon crucible by heating at about 800° C. for 1 hour under an argon atmosphere. The crucible was taken out from a furnace and the obtained melt in the crucible was poured into a brass mold followed by quenching to about 250° C. and slowly cooling to room temperature to obtain a glass disk having a diameter of about 35 mm and a thickness of about 5 mm.

A preform was prepared in accordance with the procedures of Example 1 by using the core and cladding glasses obtained above.

The resulting preform has a cladding diameter of 5.2 mm, a core diameter of 3 mm and a length of 200 mm. Interfacial crystallization was not observed.

The obtained preform was subjected to be drawn into a fiber having an outer diameter of 250 μm and a core diameter of 145 μm. The fiber exhibited a transmission loss of 0.05 dB/m at 3.5 μm and had an excellent transparent property.

The glasses were prepared separately by the same procedures as those of the preparations of core and cladding glasses mentioned above and refractive indices (nD) at 589.29 nm of the obtained glasses were measured. The refractive index of the core glass was 1.619 and that of cladding glass was 1.498. The specific refractive index difference of the above fiber was 7.5% (numerical aperture: 0.61).

Comparative example 1
(1) Preparation of a core and a cladding glass

Starting materials of $ZnF_2$, $BaF_2$, $LaF_3$, $YF_3$, $AlF_3$, NaF, LiF and $PbF_2$, each of them being an anhydride, were weighed and mixed so as to obtain a batch of 58 $ZnF_2$-6 $BaF_2$-3.5 $LaF_3$-2 $YF_3$-2.5 $AlF_3$-3 LiF-25 $PbF_2$, expressed in terms of mol % for the preparation of a core glass, and a batch of 47.5 $ZnF_2$-23.5 $BaF_2$-2.5 $LaF_3$-2 $YF_3$-4.5 $AlF_3$-20 NaF, expressed in terms of mol % for the preparation of a cladding glass. To a 30 g batch of each mixture, 3.5 g of $NH_4HF_2$ was added, and the resulting mixture was melted in a carbon crucible by heating sequentially at 450° C. for 0.5 hour and at 850° C. for 1 hour under argon atmosphere.

Thereafter, as to the core glass, the crucible was taken out from a furnace, and the obtained melt in the crucible was cast into a brass mold followed by quenching to about 250° C. and then slowly cooling to room temperature, to obtain a glass disk having a diameter of about 35 mm and a thickness of about 15 mm.

As to the cladding glass, the crucible was taken out from a furnace, and the obtained melt in the crucible was directly quenched to about 250° C. followed by slowly cooling to room temperature to obtain a glass disk having a diameter of about 35 mm and a thickness of about 15 mm.

The core and cladding glasses obtained as above were processed by extrusion molding into a preform, which was then subjected to be drawn into a fiber, in the same manner as described in Example 1.

The obtained fiber had an outer diameter of 250 μm and a core diameter of 150 μm. In some part of this fiber, there had been observed light scattering points due to the crystallization of the core glass. In the part having plural numbers of scattering points per meter, the fiber exhibited a transmission loss of 1 dB/m at 3.5 μm, whereas in the part having no scattering point, the fiber exhibited a transmission loss of 0.2 dB/m.

The glasses were prepared separately by the same procedures as those of the preparations of core and cladding glasses mentioned above and refractive indices (nD) at 589.29 nm were measured. The refractive index (nD) of the core glass was 1.580 and that of the cladding glass was 1.495. The specific refractive index difference between core and cladding was 5.4% (numerical aperture of 0.51).

This core glass had the composition identical with that which was disclosed in the Japanese Patent Laid Open No.6-69584 as allowing high content of Pb and represented by the formula (59.5–0.5y) $ZrF_2$-2y $BaF_2$-(32.5–2.5y) $PbF_2$-3.5 $LaF_3$-2 $YF_3$-2.5 $AlF_3$-y LiF (mol %) wherein y represents 3.

On the other hand, in order to prepare an optical fiber having a larger specific refractive index difference between core and cladding, the core glass having the composition represented by the formula 58.5 $ZrF_2$-4 $BaF_2$-3.5 $LaF_3$-2 $YF_3$-2.5 $AlF_3$-2 LiF-27.5 $PbF_2$ (y=2) was prepared. This core glass was observed to include a number of crystals, thus failed to give a homogeneous glass. In other words, a fluoride glass containing Zr as main constituent had the upper limit of $PbF_2$ at 25 mol %, and it was difficult to obtain a glass having a higher refractive index by the incorporation of a higher proportion of $PbF_2$.

Examples 22 to 83

In each of these examples, by starting with a cladding glass having a composition (a, b, c) shown in Table 3 and a core glass having a composition shown in Tables 4 to 13, a fiber was fabricated in the same manner as in Example 1. Each of the starting materials was always consisted of fluoride or chloride anhydride.

The specific refractive index differences between core and cladding had a value in the range of 5.7% to 9.4% as shown in the lowermost row in Tables 4 to 13. The fibers which were obtained in these examples showed a transmission loss in the range of 0.05 to 0.2 dB/m at 3.5 μm, which confirmed an excellent transparent property.

TABLE 3

| Cladding Composition | a | b | c |
|---|---|---|---|
| $ZrF_4$ (mol %) | 53 | 0 | 0 |
| $HfF_4$ | 0 | 53 | 52 |
| $ZrF_4$ + $HfF_4$ | 53 | 53 | 52 |
| $BaF_2$ | 20 | 20 | 18 |
| $LaF_3$ | 4 | 4 | 2.5 |
| $YF_3$ | 0 | 0 | 2 |
| $AlF_3$ | 3 | 3 | 4.5 |
| NaF | 20 | 20 | 21 |
| Total | 100 | 100 | 100 |
| Refractive Index ($n_D$) | 1.498 | 1.485 | 1.479 |

TABLE 4

| Example | 21 | 22 | 23 | 24 | 25 | 26 | 27 |
|---|---|---|---|---|---|---|---|
| $InF_3$ (mol %) | 20 | 26 | 20 | 19 | 22.5 | 20 | 27 |
| $GaF_3$ | 20 | 26 | 20 | 19 | 22.5 | 20 | 27 |
| $InF_3$ + $GaF_3$ | 40 | 52 | 40 | 38 | 45 | 40 | 54 |
| $CdF_2$ | 5 | 10 | 10 | 10 | 10 | 15 | 15 |
| $PbF_2$ | 30 | 29 | 30 | 27 | 25 | 25 | 25 |
| $ZnF_2$ | 21 | 3 | 12 | 20 | 15 | 15 | 0 |
| $LaF_3$ | 4 | 6 | 8 | 5 | 5 | 5 | 6 |
| $ZnF_2$ + $LaF_3$ | 25 | 9 | 20 | 25 | 20 | 20 | 6 |
| Refractive Index ($n_D$) | 1.619 | 1.632 | 1.632 | 1.616 | 1.612 | 1.618 | 1.626 |
| Cladding Composition | a | a | a | a | b | b | b |
| Cladding Refractive Index ($n_D$) | 1.498 | 1.498 | 1.498 | 1.498 | 1.485 | 1.485 | 1.485 |
| Specific Refractive Index Difference (Δn [%]) | 7.5 | 8.2 | 8.2 | 7.3 | 7.9 | 8.2 | 8.7 |

TABLE 5

| Example | 28 | 29 | 30 | 31 | 32 | 33 | 34 |
|---|---|---|---|---|---|---|---|
| $InF_3$ (mol %) | 23.5 | 17.5 | 18 | 22.5 | 23.5 | 25 | 20 |
| $GaF_3$ | 23.5 | 17.5 | 18 | 22.5 | 23.5 | 24 | 29 |
| $InF_3 + GaF_3$ | 47 | 35 | 36 | 45 | 47 | 49 | 49 |
| $CdF_2$ | 15 | 15 | 15 | 15 | 15 | 38 | 28 |
| $PbF_2$ | 20 | 28 | 20 | 25 | 15 | 13 | 23 |
| $ZnF_2$ | 13 | 20 | 25 | 15 | 18 | 0 | 0 |
| $LaF_3$ | 5 | 2 | 4 | 0 | 5 | 0 | 0 |
| $ZnF_2 + LaF_3$ | 18 | 22 | 29 | 15 | 23 | 0 | 0 |
| Refractive Index ($n_D$) | 1.602 | 1.623 | 1.595 | 1.614 | 1.583 | 1.608 | 1.626 |
| Cladding Composition | b | b | c | a | c | c | b |
| Cladding Refractive Index ($n_D$) | 1.485 | 1.485 | 1.479 | 1.498 | 1.479 | 1.479 | 1.485 |
| Specific Refractive Index Difference ($\Delta n$ [%]) | 7.3 | 8.5 | 7.3 | 7.2 | 6.6 | 8.0 | 8.6 |

TABLE 6

| Example | 35 | 36 | 37 | 38 | 39 | 40 | 41 |
|---|---|---|---|---|---|---|---|
| $InF_3$ (mol %) | 29 | 15 | 25 | 20 | 30 | 21 | 22 |
| $GaF_3$ | 20 | 25 | 15 | 20 | 30 | 21 | 22 |
| $InF_3 + GaF_3$ | 49 | 40 | 40 | 40 | 60 | 42 | 44 |
| $CdF_2$ | 21 | 15 | 15 | 20 | 17 | 20 | 20 |
| $PbF_2$ | 30 | 25 | 25 | 30 | 16 | 19 | 25 |
| $ZnF_2$ | 0 | 15 | 15 | 5 | 5 | 15 | 7 |
| $LaF_3$ | 0 | 5 | 5 | 5 | 2 | 4 | 4 |
| $ZnF_2 + LaF_3$ | 0 | 20 | 20 | 10 | 7 | 19 | 11 |
| Refractive Index ($n_D$) | 1.649 | 1.613 | 1.622 | 1.645 | 1.593 | 1.602 | 1.627 |
| Cladding Composition | a | a | b | a | c | c | a |
| Cladding Refractive Index ($n_D$) | 1.498 | 1.498 | 1.485 | 1.498 | 1.479 | 1.479 | 1.498 |
| Specifice Refractive Index Difference ($\Delta n$ [%]) | 9.2 | 7.1 | 8.5 | 8.9 | 7.2 | 7.7 | 7.9 |

TABLE 7

| Example | 42 | 43 | 44 | 45 | 46 | 47 | 48 |
|---|---|---|---|---|---|---|---|
| $InF_3$ (mol %) | 20 | 20 | 40 | 24 | 25 | 22 | 22 |
| $GaF_3$ | 20 | 40 | 20 | 24 | 25 | 22 | 22 |
| $InF_3 + GaF_3$ | 40 | 60 | 60 | 48 | 50 | 44 | 44 |
| $CdF_2$ | 19 | 17 | 17 | 25 | 30 | 30 | 40 |
| $PbF_2$ | 24 | 16 | 16 | 18 | 13 | 10 | 10 |
| $ZnF_2$ | 7 | 5 | 5 | 4 | 1 | 10 | 0 |
| $LaF_3$ | 10 | 2 | 2 | 5 | 6 | 6 | 6 |
| $ZnF_2 + LaF_3$ | 17 | 7 | 7 | 9 | 7 | 16 | 6 |
| Refractive Index ($n_D$) | 1.626 | 1.584 | 1.602 | 1.611 | 1.602 | 1.588 | 1.604 |
| Cladding Composition | a | c | b | b | b | a | a |
| Cladding Refractive Index ($n_D$) | 1.498 | 1.479 | 1.485 | 1.485 | 1.485 | 1.498 | 1.498 |
| Specific Refractive Index Difference ($\Delta n$ [%]) | 7.9 | 6.6 | 7.3 | 7.8 | 7.3 | 5.7 | 6.6 |

TABLE 8

| Example | 49 | 50 | 51 |
|---|---|---|---|
| $InF_3$ (mol %) | 22 | 22 | 22 |
| $GaF_3$ | 22 | 22 | 22 |
| $InF_3 + GaF_3$ | 44 | 44 | 44 |
| $CdF_2$ | 15 | 15 | 20 |
| $CdCl_2$ | 0 | 0 | 10 |
| $PbF_2$ | 23.5 | 18.5 | 10 |
| $PbCl_2$ | 5 | 10 | 0 |
| $ZnF_2$ | 7.5 | 7.5 | 10 |
| $LaF_3$ | 5 | 5 | 6 |
| $ZnF_2 + LaF$ | 12.5 | 12.5 | 16 |
| Anions Total (mol%) F | 96 | 92 | 92 |
| Cl | 4 | 8 | 8 |
| Refractive Index ($n_D$) | 1.640 | 1.646 | 1.590 |
| Cladding Composition | a | a | b |
| Cladding Refractive Index ($n_D$) | 1.498 | 1.498 | 1.485 |
| Specific Refractive Index Difference ($\Delta N$ [%]) | 8.7 | 9.0 | 6.6 |

TABLE 9

| Example | 52 | 53 | 54 | 55 | 56 | 57 | 58 |
|---|---|---|---|---|---|---|---|
| $InF_3$ (mol %) | 22 | 22 | 22 | 22 | 22 | 22 | 22 |
| $GaF_3$ | 22 | 22 | 22 | 22 | 22 | 22 | 22 |
| $InF_3 + GaF_3$ | 44 | 44 | 44 | 44 | 44 | 44 | 44 |
| $CdF_2$ | 15 | 10 | 10 | 10 | 10 | 10 | 10 |
| $PbF_2$ | 28.5 | 23.5 | 23.5 | 23.5 | 23.5 | 23.5 | 28.5 |
| $ZnF_2$ | 7.5 | 7.5 | 7.5 | 7.5 | 7.5 | 7.5 | 7.5 |
| $LaF_3$ | 5 | 5 | 5 | 5 | 5 | 5 | 5 |
| LiF | | 10 | | | | | |
| NaF | | | 10 | | | | |
| KF | | | | 10 | | | |
| CsF | | | | | 10 | | |
| TlF | | | | | | 10 | |
| $MgF_2$ | | | | | | | 5 |
| $CaF_2$ | | | | | | | |
| $SrF_2$ | | | | | | | |
| $BaF_2$ | | | | | | | |
| $SnF_2$ | | | | | | | |
| $ZnF_2 + LaF_3 + RF + RF_2$ | 12.5 | 22.5 | 22.5 | 22.5 | 22.5 | 22.5 | 17.5 |
| Refractive Index ($n_D$) | 1.633 | 1.597 | 1.599 | 1.602 | 1.607 | 1.632 | 1.621 |
| Cladding Composition | a | b | b | b | b | b | b |
| Cladding Refractive Index ($n_D$) | 1.498 | 1.485 | 1.485 | 1.485 | 1.485 | 1.485 | 1.485 |
| Specific Refractive Index Difference ($\Delta n$ [%]) | 8.3 | 7.0 | 7.2 | 7.3 | 7.6 | 9.0 | 8.4 |

TABLE 10

| Example | 59 | 60 | 61 | 62 | 63 | 64 | 65 |
|---|---|---|---|---|---|---|---|
| $InF_3$ (mol %) | 22 | 22 | 22 | 22 | 22 | 22 | 22 |
| $GaF_3$ | 22 | 22 | 22 | 22 | 22 | 22 | 22 |
| $InF_3 + GaF_3$ | 44 | 44 | 44 | 44 | 44 | 44 | 44 |
| $CdF_2$ | 10 | 5 | 10 | 5 | 5 | 5 | 5 |
| $PbF_2$ | 18.5 | 21 | 18.5 | 21 | 21 | 21 | 21 |
| $ZnF_2$ | 7.5 | 5 | 7.5 | 5 | 5 | | |
| $LaF_3$ | 5 | 5 | 5 | 5 | 5 | | |
| LiF | | | | | | | |
| NaF | | | | | | | |
| KF | | | | | | | |
| CsF | | | | | | | |
| TlF | | | | | | | |
| $MgF_2$ | | | | | | | |
| $CaF_2$ | 15 | 20 | | | | | |
| $SrF_2$ | | | 15 | 20 | | | |
| $BaF_2$ | | | | | 20 | 30 | |
| $SnF_2$ | | | | | | | 30 |
| $ZnF_2 + LaF_3 + RF + RF_2$ | 27.5 | 30 | 27.5 | 30 | 30 | 30 | 30 |
| Refractive Index ($n_D$) | 1.590 | 1.592 | 1.594 | 1.598 | 1.621 | 1.631 | 1.613 |
| Cladding Composition | a | b | b | b | b | b | b |
| Cladding Refractive Index ($n_D$) | 1.498 | 1.485 | 1.485 | 1.485 | 1.485 | 1.485 | 1.485 |
| Specific Refractive Index Difference ($\Delta n$ [%]) | 5.8 | 6.7 | 6.9 | 7.1 | 8.4 | 8.9 | 8.0 |

TABLE 11

| Example | 66 | 67 | 68 | 69 | 70 | 71 | 72 |
|---|---|---|---|---|---|---|---|
| $InF_3$ (mol %) | 22.5 | 20 | 20 | 20 | 20 | 20 | 20 |
| $GaF_3$ | 22.5 | 20 | 20 | 20 | 20 | 20 | 20 |
| $InF_3 + GaF_3$ | 45 | 40 | 40 | 40 | 40 | 40 | 40 |
| $CdF_2$ | 15 | 15 | 15 | 15 | 15 | 15 | 15 |
| $PbF_2$ | 28 | 28 | 28 | 28 | 28 | 28 | 28 |
| $ZnF_2$ | 7 | 7 | 7 | 7 | 7 | 7 | 7 |
| $LaF_3$ | 5 | 10 | | | | | |
| $YF_3$ | | | 10 | | | | |
| $PrF_3$ | | | | 10 | | | |
| $NdF_3$ | | | | | 10 | | |
| $SmF_3$ | | | | | | 10 | |
| $EuF_3$ | | | | | | | 10 |
| $ZnF_2 + LaF_3 + RF_3$ | 12 | 17 | 17 | 17 | 17 | 17 | 17 |
| Refractive Index ($n_D$) | 1.632 | 1.635 | 1.618 | 1.636 | 1.635 | 1.632 | 1.631 |
| Cladding Composition | a | a | a | a | a | a | a |
| Cladding Refractive Index ($n_D$) | 1.498 | 1.498 | 1.498 | 1.498 | 1.498 | 1.498 | 1.498 |

TABLE 11-continued

| Example | 66 | 67 | 68 | 69 | 70 | 71 | 72 |
|---|---|---|---|---|---|---|---|
| Specific Refractive Index Difference (Δ n [%]) | 8.2 | 8.4 | 7.4 | 8.4 | 8.4 | 8.2 | 8.2 |

TABLE 12

| Example | 73 | 74 | 75 | 76 | 77 | 78 | 79 |
|---|---|---|---|---|---|---|---|
| $InF_3$ (mol %) | 20 | 20 | 20 | 20 | 20 | 20 | 20 |
| $GaF_3$ | 20 | 20 | 20 | 20 | 20 | 20 | 20 |
| $InF_3 + GaF_3$ | 40 | 40 | 40 | 40 | 40 | 40 | 40 |
| $CdF_2$ | 15 | 15 | 15 | 15 | 15 | 15 | 15 |
| $PbF_2$ | 28 | 28 | 28 | 28 | 28 | 28 | 28 |
| $ZnF_2$ | 7 | 7 | 7 | 7 | 7 | 7 | 7 |
| $LaF_3$ | | | | | | | |
| $GdF_3$ | 10 | | | | | | |
| $TbF_3$ | | 10 | | | | | |
| $DyF_3$ | | | 10 | | | | |
| $HoF_3$ | | | | 10 | | | |
| $ErF_3$ | | | | | 10 | | |
| $TmF_3$ | | | | | | 10 | |
| $YbF_3$ | | | | | | | 10 |
| $ZnF_2 + LaF_3 + RF_3$ | 17 | 17 | 17 | 17 | 17 | 17 | 17 |
| Refractive Index ($n_D$) | 1.629 | 1.630 | 1.630 | 1.630 | 1.632 | 1.629 | 1.627 |
| Cladding Composition | a | a | a | a | a | a | b |
| Cladding Refractive Index ($n_D$) | 1.498 | 1.498 | 1.498 | 1.498 | 1.498 | 1.498 | 1.498 |
| Specific Refractive Index Difference (Δ n [%]) | 8.0 | 8.1 | 8.1 | 8.1 | 8.2 | 8.0 | 7.9 |

TABLE 13

| Example | 80 | 81 | 82 | 83 |
|---|---|---|---|---|
| $InF_3$ (mol %) | 20 | 20 | 18 | 18 |
| $GaF_3$ | 20 | 20 | 18 | 18 |
| $InF_3 + GaF_3$ | 40 | 40 | 36 | 36 |
| $CdF_2$ | 15 | 13 | 13 | 13 |
| $PbF_2$ | 28 | 28 | 28 | 28 |
| $ZnF_2$ | 7 | 7 | 7 | 7 |
| $LaF_3$ | | 4 | 4 | 4 |
| $LuF_3$ | 10 | | | |
| $BiF_3$ | | 8 | | |
| $ZrF_4$ | | | 12 | |
| $HfF_4$ | | | | 12 |
| $ZnF_2 + LaF_3 + LuF_3 + BiF_3 + RF_4$ | 17 | 19 | 23 | 23 |
| Refractive Index ($n_D$) | 1.627 | 1.654 | 1.625 | 1.622 |
| Cladding Composition | a | a | a | a |
| Cladding Refractive Index ($n_D$) | 1.498 | 1.498 | 1.498 | 1.498 |
| Specific Refreactive Index Difference (Δn [%]) | 7.9 | 9.4 | 7.8 | 7.7 |

Examples 84 to 96

In each of these examples, by starting with a core glass having a composition shown in Example 3 and a cladding glass having a composition shown in Tables 14 and 15, a fiber was fabricated in the same manner as in Example 1. Each of the starting materials was always consisted of fluoride anhydride.

The specific refractive index differences between core and cladding had a value in the range of 6.0% to 7.5% (both end inclusive) as shown in the lowermost row in Tables 14 to 15.

These fibers were observed to have a transmission loss in the range of 0.05 to 0.2 dB/m at 3.5 μm, which confirmed an excellent transparent property.

TABLE 14

| Example | 84 | 85 | 86 | 87 | 88 | 89 | 90 |
|---|---|---|---|---|---|---|---|
| $ZrF_4$ (mol %) | 47.5 | 31.5 | 0 | 37 | 54.5 | 0 | 52 |
| $HfF_4$ | 0 | 16 | 47.5 | 12 | 0 | 45.5 | 0 |
| $ZrF_4 + HfF_4$ | 47.5 | 47.5 | 47.5 | 49 | 54.5 | 45.5 | 52 |
| $BaF_2$ | 23.5 | 23.5 | 24.5 | 23 | 18 | 22.5 | 18 |
| $PbF_2$ | 0 | 0 | 0 | 0 | 0 | 0 | 0 |
| $LaF_3$ | 2.5 | 2.5 | 2.5 | 3.5 | 4.5 | 1.5 | 4 |
| $YF_3$ | 2 | 0 | 2 | 2 | 1 | 4 | 0 |
| $GdF_3$ | 0 | 2 | 0 | 0 | 0 | 0 | 0 |
| $LaF_3 + YF_3 + GdF_3$ | 4.5 | 4.5 | 4.5 | 5.5 | 5.5 | 5.5 | 4 |
| $AlF_3$ | 4.5 | 4.5 | 4.5 | 2.5 | 2.5 | 4.5 | 3 |
| NaF | 20 | 20 | 15 | 20 | 19.5 | 22 | 5 |
| LiF | 0 | 0 | 0 | 0 | 0 | 0 | 18 |
| CsF | 0 | 0 | 0 | 0 | 0 | 0 | 0 |

TABLE 14-continued

| Example | 84 | 85 | 86 | 87 | 88 | 89 | 90 |
|---|---|---|---|---|---|---|---|
| NaF + LiF + CsF | 20 | 20 | 19 | 20.0 | 19.5 | 22 | 23 |
| $InF_3$ | 0 | 0 | 0 | 0 | 0 | 0 | 0 |
| Refractive Index ($n_D$) | 1.499 | 1.497 | 1.492 | 1.499 | 1.498 | 1.482 | 1.490 |
| Cladding Composition | Composition of Example 3 | | | | | | |
| Cladding Refractive Index ($n_D$) | 1.602 | | | | | | |
| Specific Refractive Index Difference ($\Delta n$ [%]) | 6.4 | 6.6 | 7.1 | 6.4 | 6.5 | 7.5 | 7.0 |

TABLE 15

| Example | 91 | 92 | 93 | 94 | 95 | 96 |
|---|---|---|---|---|---|---|
| $ZrF_4$ (mol %) | 53 | 53 | 52 | 13 | 12 | 52 |
| $HfF_4$ | 0 | 0 | 0 | 40 | 40 | 0 |
| $ZrF_4 + HfF_4$ | 53 | 53 | 52 | 53 | 52 | 52 |
| $BaF_2$ | 20 | 20 | 20 | 20 | 17.5 | 19 |
| $PbF_2$ | 0 | 0 | 0 | 2 | 5 | 0 |
| $LaF_3$ | 0 | 4 | 4 | 4 | 4 | 3.5 |
| $YF_3$ | 0 | 0 | 0 | 0 | 0 | 0 |
| $GdF_3$ | 4 | 0 | 0 | 0 | 0 | 0 |
| $LaF_3 + YF_3 + GdF_3$ | 4 | 4 | 4 | 4 | 4 | 3.5 |
| $AlF_3$ | 3 | 3 | 3 | 3 | 3 | 2.5 |
| NaF | 20 | 7 | 19 | 18 | 18.5 | 23 |
| LiF | 0 | 5 | 0 | 0 | 0 | 0 |
| CsF | 0 | 8 | 0 | 0 | 0 | 0 |
| NaF + LiF + CsF | 20 | 20 | 19 | 18 | 18.5 | 23 |
| $InF_3$ | 0 | 0 | 2 | 0 | 0 | 0 |
| Refractive Index ($n_D$) | 1.497 | 1.505 | 1.502 | 1.499 | 1.506 | 1.496 |
| Cladding Composition | Composition of Example 3 | | | | | |
| Cladding Refractive Index ($n_D$) | 1.602 | | | | | |
| Specific Refractive Index Difference ($\Delta n$ [%]) | 6.5 | 6.1 | 6.2 | 6.4 | 6.0 | 6.6 |

Examples 97 to 106

In each of these examples, by starting with a core glass (refractive index 1.632) having a composition shown in Example 23 and a cladding glass having a composition shown in Table 16, a fiber was fabricated in the same manner as in Example 1. Each of the starting materials was always consisted of fluoride anhydride.

The specific refractive index differences between core and adding had a value in the range of 7.2% to 8.0% (both end inclusive) as shown in the lowermost row in Table 16.

These fibers were observed to have a transmission loss in the range of 0.05 to 0.2 dB/m at 3.5 μm, which confirmed an excellent transparent property.

TABLE 16

| Example | 97 | 98 | 99 | 100 | 101 | 102 | 103 | 104 | 105 | 106 |
|---|---|---|---|---|---|---|---|---|---|---|
| Starting Materials | | | | | | | | | | |
| $ZrF_4$ [mol %] | 0 | 50 | 53 | 53 | 53 | 53 | 52 | 53 | 53 | 12 |
| $HfF_4$ | 52 | 0 | 0 | 0 | 0 | 0 | 0 | 0 | 0 | 40 |
| (Zr + Hf) | 52 | 50 | 53 | 53 | 53 | 53 | 52 | 53 | 53 | 52 |
| $BaF_2$ | 17.5 | 24 | 18 | 18 | 18 | 20 | 17.5 | 20 | 20 | 16.5 |
| $PbF_2$ | 5 | 0 | 3 | 3 | 3 | 0 | 5 | 2 | 2 | 7 |
| $LaF_3$ | 4 | 4 | 2 | 2 | 3 | 4 | 4 | 4 | 4 | 4 |
| $YF_3$ | 0 | 0 | 2 | 0 | 0 | 0 | 0 | 0 | 0 | 0 |
| $GdF_3$ | 0 | 0 | 0 | 2 | 0 | 0 | 0 | 0 | 0 | 0 |
| (La + Y + Gd) | 4 | 4 | 4 | 4 | 3 | 4 | 4 | 4 | 4 | 4 |
| $AlF_3$ | 3 | 3 | 3 | 3 | 4 | 3 | 3 | 3 | 3 | 3 |
| NaF | 18.5 | 17 | 19 | 19 | 19 | 11 | 13.5 | 18 | 8 | 12.5 |
| LiF | 0 | 0 | 0 | 0 | 0 | 5 | 5 | 0 | 10 | 5 |
| CsF | 0 | 0 | 0 | 0 | 0 | 4 | 0 | 0 | 0 | 0 |
| (Na + Li + Cs) | 18.5 | 17 | 19 | 19 | 19 | 20 | 18.5 | 18 | 18 | 17.5 |
| $InF_3$ | 0 | 2 | 0 | 0 | 0 | 0 | 0 | 0 | 0 | 0 |
| Total (mol %) | 100 | 100 | 100 | 100 | 100 | 100 | 100 | 100 | 100 | 100 |
| Cladding Refractive Index ($n_D$) | 1.503 | 1.509 | 1.506 | 1.508 | 1.507 | 1.502 | 1.515 | 1.509 | 1.506 | 1.512 |
| Specific Refractive Index Difference ($n_D$) | 7.9 | 7.6 | 7.7 | 7.6 | 7.7 | 8.0 | 7.2 | 7.6 | 7.7 | 7.4 |

Example 107

In order to obtain a core glass, a glass disk (having a diameter of 35 mm and a thickness of 5 mm) weighing 30 g and having the same composition as that in Example 3 except that a part (0.04 mol %) of $LaF_3$ was replaced with $PrF_3$ was prepared in the manner as described in Example 1, and, in order to obtain a cladding glass, three glass disks (having a diameter of 35 mm and a thickness of 15 mm) weighing 60 g and having the same composition as that in Example 1 were prepared.

Both surfaces of these three cladding glass disks and a surface (one side) of the core glass were polished to a surface precision of at most $\lambda/2$. While the polished surfaces of the glasses were optically contacted in a clean booth, both glasses were processed with an extrusion molding technique under the same conditions as in Example 1 to obtain a primary preform having a cladding diameter of 5.2 mm, a core diameter of 0.17 mm and a length of 200 mm. The obtained preform was cut into a fragment of 13 mm long, one of the end faces of which was polished to a surface precision of at most $\lambda/2$, then placed in a subcylinder having an outer diameter of 35 mm, an inner diameter of 5.5 mm and a thickness of 10 mm. In order to prepare an another cladding glass, a glass disk (having a diameter of 35 mm and a thickness of 15 mm) weighing 60 g and having the same composition as that of Example 1 was prepared. Both surfaces of the obtained glass disk were polished to a surface precision of at most $\lambda/2$.

In the above procedure, the primary preform was prepared by an extrusion molding method. However, other known methods for the preparation of fiber preform of fluorides are also applicable: build-in casting ("Fluoride Glasses" ed. A. E. Comyns (John Willy & Sons, America), p187), rotational casting and suction casting (T. Kanamori, Materials Science Forum, Vol. 19–20, pp363–374). Of course, it is possible to use these methods in combination and a suitable method can be selected.

After the polished surfaces of the primary preform and the another cladding glass had been optically contacted in a clean booth, the preform, the subcylinder and the cladding glass (having a diameter of 35 mm and a thickness of 15 mm) were introduced into a cylinder having an inner diameter of about 35 mm so that the preform might be positioned on the side of a punch. Subsequently, the extrusion molding was conducted in the same manner as in Example 1 to obtain a secondary preform having a cladding diameter of 5.0 mm, a core diameter of 48 m and a length of 200 mm.

The secondary preform obtained as above was subjected to be drawn into a fiber having an outer diameter of 125 $\mu$m and a core diameter of 1.2 $\mu$m.

This fiber exhibited a transmission loss of 0.05 dB/m at 3.5 $\mu$m, confirming that it had an excellent transparent property. This fiber had a specific refractive index difference of 8.2% between core and cladding, a numerical aperture of 0.65 and a cut off wavelength of 1.0 $\mu$m, thus becoming single mode fiber at the wavelength exceeding 1.0 $\mu$m.

Figure 4:
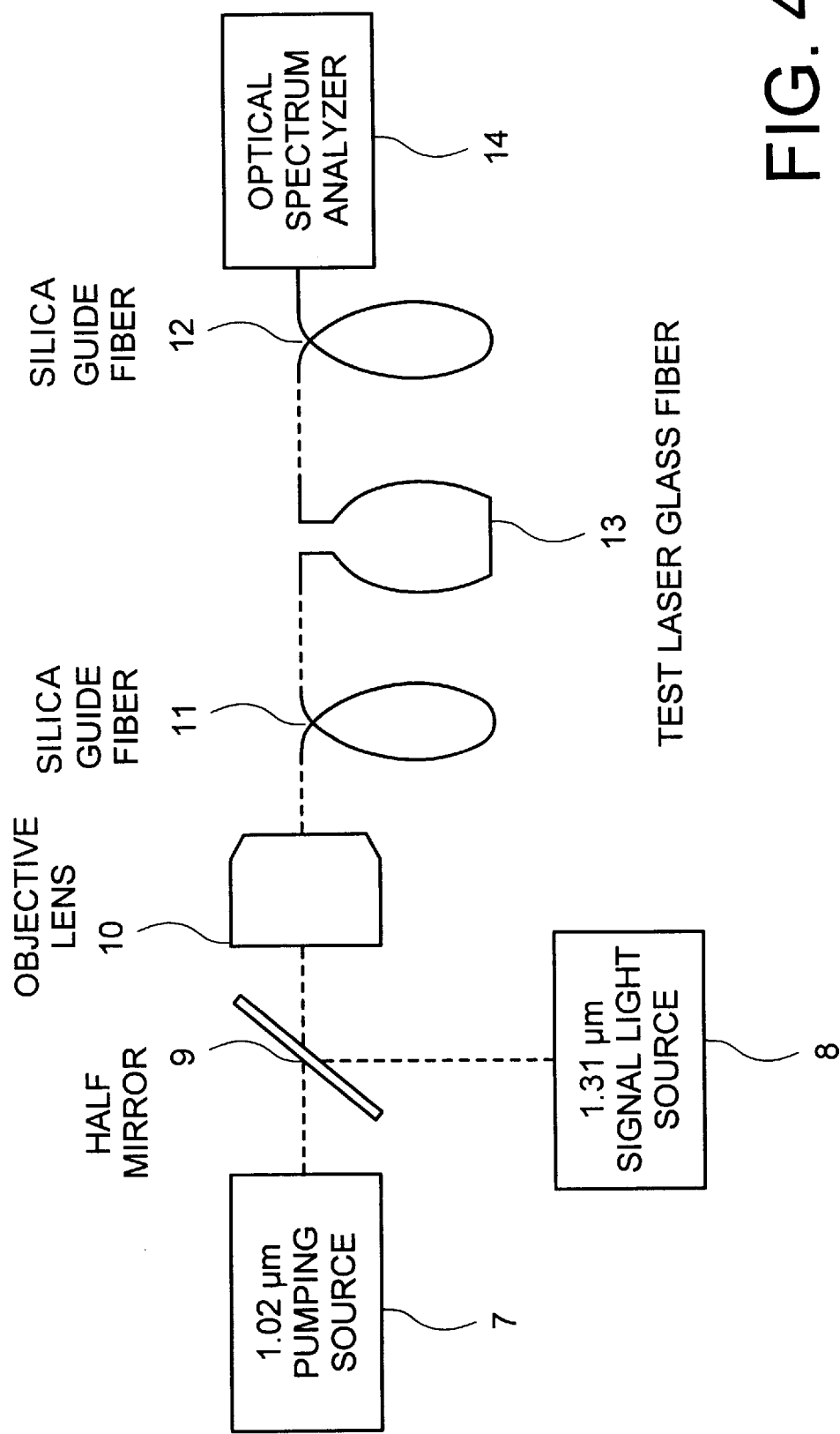
FIG. 4 is a schematic view of an optical amplification measuring system for evaluating the amplification properties of optical fibers fabricated in the examples of the present invention

In order to determine the optical amplification characteristics of this fiber, an optical amplifier shown in FIG. 4 was fabricated by using 20 m of the obtained fiber. The reference numerals in this figure are used for indicating the followings: 7 for a pumping source at 1.02 $\mu$m, 8 for a signal light source at 1.31 $\mu$m, 9 for a half mirror acting as an optical coupler, 10 for an objective lens, 11 and 12 for silica guide fibers for pumping light and signal light, 13 for test optical fiber and 14 for optical spectrum analyzer.

The broken line in this figure schematically represents a path of lights (pumping light and signal light).

Measurement of light signal amplification was carried out as follows. The signal light at 1.31 $\mu$m supplied from the signal light source 8 and the pumping light at 1.02 $\mu$m supplied from the pumping source 7 are multiplexed through the half mirror, focused by the objective lens 10 and injected into the silica guide fiber 11. By contacting an end of this silica guide fiber 11 with the end surface of the test fiber 13, the signal light and the pumping light can be simultaneously injected into the test fiber 13. Optical output from the test fiber 13 is guided by the silica guide fiber 12, one end of which is contacted with the end of the test fiber 13, and monitored by the optical spectrum analyzer 14. Intensity, wavelength and the like of the signal light are determined by the optical spectrum analyzer 14. Signal light intensities upon on- and off-states of the pumping light were measured and the gain was calculated.

As a result of this measurement, it was found that, with 100 mW of the pumping light input, 27 dB of gain was obtained.

Comparative Example 2

As core glass, a glass disk (having a diameter of 35 mm and a thickness of 5 mm) composed of a glass weighing 30 g and having the same composition as that in Example except that a part (0.04 mol %) of $LaF_3$ was replaced with $PrF_3$ was prepared in the manner as described in Comparative Example 1, and, as cladding glass, four glass disk (having a diameter of 35 mm and a thickness of 15 mm) each composed of a glass weighing 60 g and having the same composition as that in Example 1 were prepared.

Starting with the core glass and each of three cladding glasses obtained as above, a primary preform having a cladding diameter of 5.1 mm, a core diameter 0.17 mm and a length of 200 mm were prepared in the same manner as in Example 107.

The obtained preform were cut into a fragment of 13 mm long, one of the end faces of which was polished to a surface precision of at most $\lambda/2$, then placed in a subcylinder having an outer diameter of 35 mm, an inner diameter of 5.5 mm and a thickness of 10 mm. In order to prepare a cladding glass, a glass disk (having a diameter of 35 mm and a thickness of 15 mm) was polished to a surface precision of at most $\lambda/2$.

After the polished surfaces of the primary preform and that of the cladding glass had been optically contacted in a clean booth, the preform, the subcylinder and the cladding glass (having a diameter of 35 mm and a thickness of 15 mm) were introduced into a cylinder having an inner diameter of about 35 mm so that the preform might be positioned on the side of a punch. Subsequently, the extrusion molding conducted in the same manner as in Example 1, to obtain a secondary preform having a cladding diameter of 5.0 mm, a core diameter of 60 $\mu$m and a length of 200 mm.

The secondary preform obtained as above was subjected to be drawn into a fiber having an outer diameter of 125 $\mu$m and a core diameter of 1.5 $\mu$m. This fiber had a specific refractive index difference of 5.4% between core and cladding, a numerical aperture of 0.51 and a cut off wavelength of 1.0 $\mu$m, thus becoming single mode fiber at the wavelength exceeding 1.0 $\mu$m.

Optical amplification characteristics of this fiber were determined in the same manner as in Example 107 and it was found that only 15 dB of gain was obtained with pumping light of 100 mW.

Comparative Example 3

Starting materials of $InF_3$, $ZnF_2$, $BaF_2$, $SrF_2$, $PbF_2$, $GaF_3$, $YF_3$, NaF and $PrF_3$, each of them being an anhydride, were weighed and mixed so as to obtain a batch of 30 InF$_3$-25 ZnF$_2$-5 BaF$_2$-9 SrF$_2$-20 PbF$_2$-4 GaF$_3$-3.95 YF$_3$-3 NaF-0.05 PrF$_3$ expressed in terms of mol %, to prepare a core glass. 3.5 g of NH$_4$HF$_2$ was added to 30 g of the batch.

Starting materials of ZrF$_4$, BaF$_2$, LaF$_3$, YF$_3$, AlF$_3$ and NaF, each of them being an anhydride, were weighed and mixed so as to obtain a batch of 47.5 ZrF$_4$-23.5 BaF$_2$-2.5 LaF$_3$-2 YF$_3$-4.5 AlF$_3$-20 NaF expressed in terms of mol %, to prepare a cladding glass. 3.5 g of NH$_4$HF$_2$ was added to 60 g of the batch.

Starting from these both batches, a core glass (having a diameter of 35 mm and a thickness of 5 mm) weighing 30 g and four cladding glasses (having a diameter of 35 mm and a thickness of 15 mm) weighing 60 g were prepared in the same manner as described in Comparative Example 1.

The combination of these glasses corresponds to that disclosed in Japanese Patent Laid Open 6-69584 wherein the same combination containing a InF$_3$-based core glass is described as having a large specific refractive index difference.

These glasses were processed in the same manner as in Example 107, to obtain a primary preform having a cladding diameter of 5.1 mm, a core diameter of 0.2 mm and a length of 200 mm. Then, the preform was processed in the same manner as in Comparative Example 2 into a secondary preform, which was then processed into a fiber having an outer diameter of 125 μm and a core diameter of 1.7 μm. This fiber had a specific refractive index difference of 4.7% between core and cladding, a numerical aperture of 0.48 and a cut off wavelength of 1.0 μm, thus becoming single mode fiber at the wavelength exceeding 1.0 μm.

Optical amplification characteristics of this fiber were determined in the same manner as in Example 107 and it was found that only 20 dB of gain was obtained with pumping light of 100 mW.

As clearly seen from the comparison of Example 107 with Comparative Examples 2 and 3, it was confirmed that the optical amplifier fabricated by using optical fibers of the present invention exhibited a remarkably improved performance as compared with that fabricated by using conventional optical fibers.

As explained in the above, the optical fibers of the present invention have a good transparency at a wavelength in the visible to infrared region and a remarkably elevated numerical aperture as compared with conventional optical fibers made from halide glasses, thus they are applicable to optical communication, optical measurement, laser transmission and the like.

In addition, it may be possible to fabricate therefrom laser fibers or optical fibers for the optical amplification operating in the visible to med-infrared region with a higher efficiency due to the doping of rare earth ions which act as activating ions.

Such optical fibers, when applied to the optical amplification, could give low-cost amplifiers with high efficiency.

What is claimed is:

1. An optical fiber comprising a core and a cladding wherein the core is composed of a In-Ga-Cd-Pb halide glass and the cladding composed of a halide glass possesses a refractive index of 1.515 or less, and wherein the In-Ga-Cd-Pb halide glass contains, expressed in terms of mol %, In: 15–40%
Ga: 15–40%,
 wherein In+Ga=35–65%,
Cd: 5–40%,
Pb: 10–30%,
as cations constituting the glass and F or F and Cl as anions constituting the glass wherein the Cl content is 10% or less.

2. An optical fiber comprising a core and a cladding wherein the core is composed of a In-Ga-Cd-Pb halide glass and the cladding composed of a halide glass possesses a refractive index of 1.500 or less, and wherein the In-Ga-Cd-Pb halide glass contains, expressed in terms of mol %, In: 15–40%,
Ga: 15–40%,
 wherein In+Ga=35–65%,
Cd: 5–40%,
Pb: 10–30%,
as cations constituting the glass and F or F and Cl as anions constituting the glass wherein the Cl content is 10% or less.

3. The optical fiber of claim 1 wherein the In-Ga-Cd-Pb halide glass contains, expressed in terms of mol %, In: 17–35%,
Ga: 17–35%,
 wherein In+Ga=40–65%,
Cd: 7.5–30%,
Pb: 12–30%,
as cations constituting the glass and F or F and Cl as anions constituting the glass wherein the Cl content is 5% or less.

4. The optical fiber of claim 2 wherein the In-Ga-Cd-Pb halide glass contains, expressed in terms of mol %, In: 17–35%,
Ga: 17–35%,
 wherein In+Ga=40–65%,
Cd: 7.5–30%,
Pb: 12–30%,
as cations constituting the glass and F or F and Cl as anions constituting the glass wherein the Cl content is 5% or less.

5. The optical fiber of claim 1 wherein the In-Ga-Cd-Pb halide glass further contains, expressed in terms of mol %, Li: 0–12%, Na: 0–12%, K: 0–12%,
Cs: 0–12%, Tl: 0–12%,
Mg: 0–8%, Ca: 0–23%, Sr: 0–23%,
Ba: 0–34%, Zn: 0–28%, Sn: 0–34%,
Y: 0–12%, La: 0–12%, Gd: 0–12%,
Lu: 0–12%,
Pr: 0–12%, Nd: 0–12%, Sm: 0–12%,
Eu: 0–12%, Tb: 0–12%, Dy: 0–12%,
Ho: 0–12%, Er: 0–12%, Tm: 0–12%,
Yb: 0–12%,
Bi: 0–9%, Zr: 0–15%, Hf: 0–15%
as cations constituting the glass and total content of the above cations is 0.01–35%.

6. The optical fiber of claim 2 wherein the In-Ga-Cd-Pb halide glass further contains, expressed in terms of mol %, Li: 0–12%, Na: 0–12%, K: 0–12%,
Cs: 0–12%, Tl: 0–12%,
Mg: 0–8%, Ca: 0–23%, Sr: 0–23%,
Ba: 0–34%, Zn: 0–28%, Sn: 0–34%,
Y: 0–12%, La: 0–12%, Gd: 0–12%,
Lu: 0–12%,
Pr: 0–12%, Nd: 0–12%, Sm: 0–12%,
Eu: 0–12%, Tb: 0–12%, Dy: 0–12%,
Ho: 0–12%, Er: 0–12%, Tm: 0–12%,
Yb: 0–12%, Bi: 0–9%, Zr: 0–15%, Hf: 0–15%,
as cations constituting the glass and total content of the above cations is 0.01–35%.

7. The optical fiber of claim 3 wherein the In-Ga-Cd-Pb halide glass further contains, expressed in terms of mol %,
Li: 0–12%, Na: 0–12%, K: 0–12%,
Cs: 0–12%, Tl: 0–12%,
Mg: 0–8%, Ca: 0–23%, Sr:0–23%,
Ba: 0–34%, Zn: 0–28%, Sn 0–34%,
Y: 0–12%, La: 0–12%, Gd 0–12%,
Lu: 0–12%,
Pr: 0–12%, Nd: 0–12%, Sm: 0–12%,
Eu: 0–12%, Tb: 0–12%, Dy: 0–12%,
Ho: 0–12%, Er: 0–12%, Tm: 0–12%,
Yb: 0–12%,
Bi: 0–9%, Zr: 0–15%, Hf: 0–15%,
as cations constituting the glass and total content of the above cations is 0.01–35%.

8. The optical fiber of claim 4 wherein the In-Ga-Cd-Pb halide glass further contains, expressed in terms of mol %,
Li: 0–12%, Na: 0–12%, K: 0–12%,
Cs: 0–12%, Tl: 0–12%,
Mg: 0–8%, Ca: 0–23%, Sr: 0–23%,
Ba: 0–34%, Zn: 0–28%, Sn: 0–34%,
Y: 0–12%, La: 0–12%, Gd: 0–12%,
Lu: 0–12%,
Pr: 0–12%, Nd: 0–12%, Sm: 0–12%,
Eu: 0–12%, Tb: 0–12%, Dy: 0–12%,
Ho: 0–12%, Er: 0–12%, Tm: 0–12%,
Yb: 0–12%,
Bi: 0–9%, Zr: 0–15%, Hf: 0–15%,
as cations constituting the glass and total content of the above cations is 0.01–35%.

9. The optical fiber of claim 1 wherein the halide glass possessing a refractive index of 1.515 or less contains, expressed in terms of mol %,
In: 28–40%,
Zn: 20–30%,
Ba: 15–25%,
Sr: 8–20%,
as cations constituting the glass and F as anions constituting the glass.

10. The optical fiber of claim 9 wherein the halide glass possessing a refractive index of 1.515 or less further contains, expressed in terms of mol %,
Pb: 0–10%, Ga: 0–6%, Al: 0–4%,
Ca: 0–6%, Cd: 0–5%, Y: 0–4%,
La: 0–2%, Na: 0–5%, Li: 0–4%,
as cations constituting the glass and total content of the above cations is 2–25%.

11. The optical fiber of claim 2 wherein the halide glass possessing a refractive index of 1.500 or less contains, expressed in terms of mol %,
In: 30–40%,
Zn: 20–30%,
Ba: 15–25%,
Sr: 10–20%,
as cations constituting the glass and F as anions constituting the glass.

12. The optical fiber of claim 11 wherein the halide glass possessing a refractive index of 1.500 or less further contains, expressed in terms of mol %,
Ga: 0–6%, Ca: 0–6%, Cd: 0–5%,
Y: 0–2%, La: 0–2%, Na: 0–5%,
Li: 0–2%,
as cations constituting the glass and total content of the above cations is 2–15%.

13. The optical fiber of claim 1 wherein the halide glass possessing a refractive index of 1.515 or less contains, expressed in terms of mol %,
at least one of Zr and Hf: 45–55%,
Ba: 17–25%,
Pb: 0–7%,
La: 0–5%,
Y: 0–4%,
Gd: 0–4%,
wherein La+Y+Gd=3.5–6%,
Al: 2.5–5%,
Na: 5–23%,
Li: 0–18%,
Cs: 0–8%,
wherein Na+Li+Cs=17–23%,
In: 0–2%,
as cations constituting the glass and F as anions constituting the glass.

14. The optical fiber of claim 2 wherein the halide glass possessing a refractive index of 1.500 or less contains, expressed in terms of mol %, at least one of Zr and Hf: 45–55%,
Ba: 17–25%,
Pb: 0–2%,
La: 0–5%,
Y: 0–4%,
Gd: 0–4%,
wherein La+Y+Gd 3.5–6%,
Al: 2.5–5%,
Na: 5–23%,
Li: 0–18%,
Cs: 0–4%,
wherein Na+Li+Cs=17–23%,
In: 0–2%,
as cations constituting the glass and F as anions constituting the glass.

15. The optical fiber of claim 1 wherein the In-Ga-Cd-Pb halide glass contains activating ions or activating ions and sensitizing ions for sensitizing the activating ions.

16. The optical fiber of claim 2 wherein the In-Ga-Cd-Pb halide glass contains activating ions or activating ions and sensitizing ions for sensitizing the activating ions.

17. The optical fiber of claim 15 wherein the activating ions are one or more kinds of ions selecting from the group consisting of Pr, Nd, Sm, Eu, Tb, Dy, Ho, Er, Tm and Yb, and total content of the above ions ranges from 0.01–12 mol %.

18. The optical fiber of claim 16 wherein the activating ions are one or more kinds of ions selecting from the group consisting of Pr, Nd, Sm, Eu, Tb, Dy, Ho, Er, Tm and Yb, and total content of the above ions ranges from 0.01–12 mol %.

19. The optical fiber of claim 17 wherein the activating ions are one or more kinds of ions selecting from the group consisting of Pr, Nd, Sm, Dy, Ho and Er, and the optical fiber is utilized at 1.31 μm region for optical amplification.

20. The optical fiber of claim 18 wherein the activating ions are one or more kinds of ions selecting from the group consisting of Pr, Nd, Sm, Dy, Ho and Er, and the optical fiber is utilized at 1.3 μm region for optical amplification.

21. An optical fiber amplifier comprising a pumping source, a laser glass fiber and a means for introducing pumping light and signal light into the above laser glass fiber, wherein the laser glass fiber is an optical fiber of claim 15.

22. An optical fiber amplifier comprising a pumping source, a laser glass fiber and a means for introducing pumping light and signal light into the above laser glass fiber, wherein the laser glass fiber is an optical fiber of claim 16.

23. An optical fiber comprising a core and a cladding wherein the core is comprised of a In-Ga-Cd-Pb halide glass and the cladding is composed of a halide glass possessing a refractive index of about 1.5 or less, wherein said core glass is prepared from anhydrides of $InF_3$, $GaF_3$, $CdF_2$, $PbF$, $ZnF_2$, and $LaF_3$, in a batch of about 20 $InF_3$-20 $GaF_3$-5 $CdF_2$-30 $PbF$, -21 $ZnF_2$-4 $LaF_3$, expressed in terms of mol %, and said cladding glass is prepared from anhydrides of $ZrF_2$, $BaF_2$, $LaF_3$, $AlF_3$, and NaF, in a batch of about 53 ZrF2-20 $BaF_2$-4 $LaF_3$-3 $AlF_3$-20 NaF, expressed in terms of mol %.

* * * * *